(12) United States Patent
Lin et al.

(10) Patent No.: US 7,712,963 B2
(45) Date of Patent: May 11, 2010

(54) FAN, MOTOR AND BEARING STRUCTURE THEREOF

(75) Inventors: Yung-Ping Lin, Taoyuan Hsien (TW);
Dung-Chang Yeh, Taoyuan Hsien (TW);
Yong Duan, Taoyuan Hsien (TW); Gang Tong, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 732 days.

(21) Appl. No.: 11/638,556

(22) Filed: Dec. 14, 2006

(65) Prior Publication Data
US 2007/0217720 A1    Sep. 20, 2007

(30) Foreign Application Priority Data
Mar. 17, 2006    (TW) .............................. 95109135 A (51) Int. Cl.
*F16C 32/06*    (2006.01)
(52) U.S. Cl. ....................................... 384/100; 384/119
(58) Field of Classification Search ................ 384/100, 384/107, 114, 119; 310/90; 417/423.12–423.14; 360/99.08
See application file for complete search history.

(56) References Cited

U.S. PATENT DOCUMENTS

| 5,610,462 | A  | * | 3/1997 | Takahashi | 310/90 |
|---|---|---|---|---|---|
| 6,554,478 | B2 | * | 4/2003 | Hsieh | 384/130 |
| 6,954,017 | B2 | * | 10/2005 | Takahashi et al. | 310/85 |
| 7,521,830 | B2 | * | 4/2009 | Chen et al. | 310/90 |
| 2005/0123224 | A1 | * | 6/2005 | Chen | 384/119 |
| 2005/0135715 | A1 | * | 6/2005 | Chen | 384/119 |
| 2005/0220378 | A1 | * | 10/2005 | Kaneko et al. | 384/100 |
| 2007/0076990 | A1 | * | 4/2007 | Tsai et al. | 384/100 |

* cited by examiner

*Primary Examiner*—Thomas R Hannon
(74) *Attorney, Agent, or Firm*—Birch, Stewart, Kolasch & Birch, LLP (57) ABSTRACT

A bearing structure which is cooperated with a shaft and is disposed in a bearing tube comprises an oil bearing and a cylindrical sealing member. The oil bearing has an axial hole. The shaft passes through the axial hole. The cylindrical sealing member covers a top surface and at least a portion of a sidewall of the oil bearing. The cylindrical sealing member has a through hole defined in its center. The shaft passes through the through hole.

20 Claims, 11 Drawing Sheets

FAN, MOTOR AND BEARING STRUCTURE THEREOF

CROSS REFERENCE TO RELATED APPLICATIONS

This Non-provisional application claims priority under 35 U.S.C. §119(a) on Patent Application No(s). 095109135 filed in Taiwan, Republic of China on Mar. 17, 2006, the entire contents of which are hereby incorporated by reference.

BACKGROUND OF THE INVENTION

1. Field of Invention

The invention relates to a fan, a motor and a bearing structure thereof, and in particular, to a fan, a motor and a bearing structure thereof capable of preventing oil leakage.

2. Related Art

Many apparatuses (e.g., fans) use motors to transmit power. Accordingly, the quality of the motor greatly influences the quality of the apparatus. If the motor works unstably, the operation of the overall apparatus will be inevitably influenced. The bearing in the motor is one of the key factors to influence the quality of the motor.

The conventional motor frequently uses a ball bearing. However, the ball bearing has a high cost, cannot resist the impact of exterior force, and cannot provide the sufficient lubrication while rotating at a high speed. Thus, the prior art uses an oil bearing to replace the ball bearing. However, when the oil bearing is mounted on a bearing tube, a sufficient combining force has to be applied to prevent the axial detachment of the shaft. The combining force is directly applied to the oil bearing to make the aperture in the oil bearing shrink. Thus, the wear between the shaft and the oil bearing becomes serious, and the lifetime of the product is shortened.

The typical oil bearing is made of a porous material, in which a plurality of micro voids is formed and lubrication oil is contained therein. When a shaft is rotating in the oil bearing, the capillary phenomenon of the micro voids draws the lubrication oil into a gap between the shaft and the oil bearing, thereby lubricating the shaft and the oil bearing. However, because the shaft wears against the oil bearing for a long period of time, the lubrication oil evaporates and transforms at the high temperature and thus influences the lubrication function of the oil bearing. When the motor operates in an upside-down manner, the lubrication oil leaks from the gap between the shaft and the oil bearing due to gravity and cannot be recycled, causing insufficient lubrication.

Figure 1:
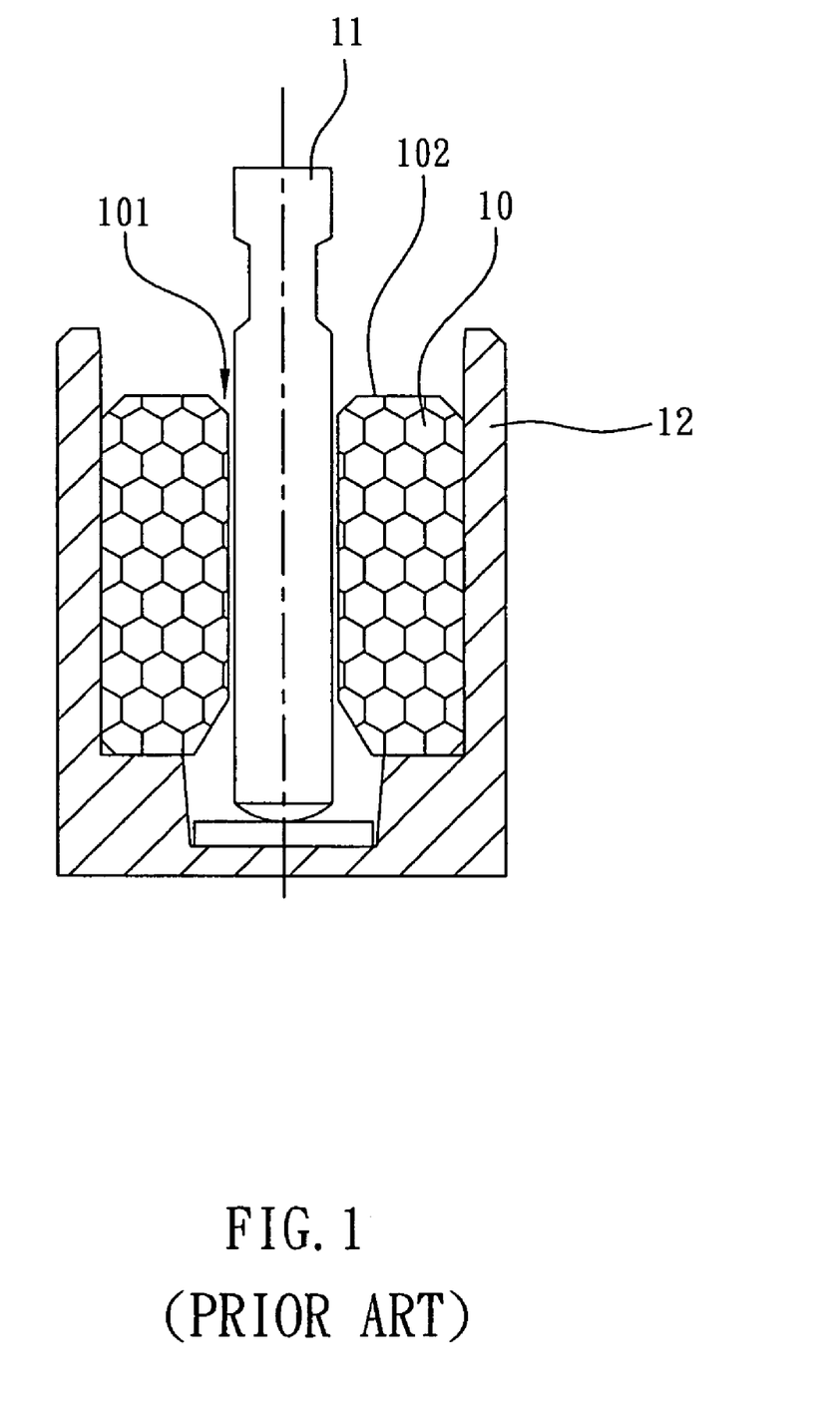
FIG. 1 is a schematic illustration showing a conventional oil bearing cooperated with a shaft.

As shown in FIG. 1, a conventional oil bearing 10 has an axial hole 101 for telescoping a shaft 11 therein. The oil bearing 10 is disposed in a bearing tube 12 of a stator seat. Because a top surface 102 of the oil bearing 10 directly contacts the air on the outside, the lubrication oil, which is driven by the rotating shaft 11, leaks to the outside from the top surface 102 of the oil bearing 10, the gap between the oil bearing 10 and the shaft 11, and the gap between the oil bearing 10 and the bearing tube 12. In particular, when the oil bearing 10 is used in an upside-down manner, the leakage condition becomes more serious such that the lifetime of the oil bearing 10 is shortened. Alternatively, the resultant lack of lubrication oil causes the overall operation to become rough, or causes the oil bearing to become damaged by the frictional force between the shaft and the oil bearing.

Figure 2:
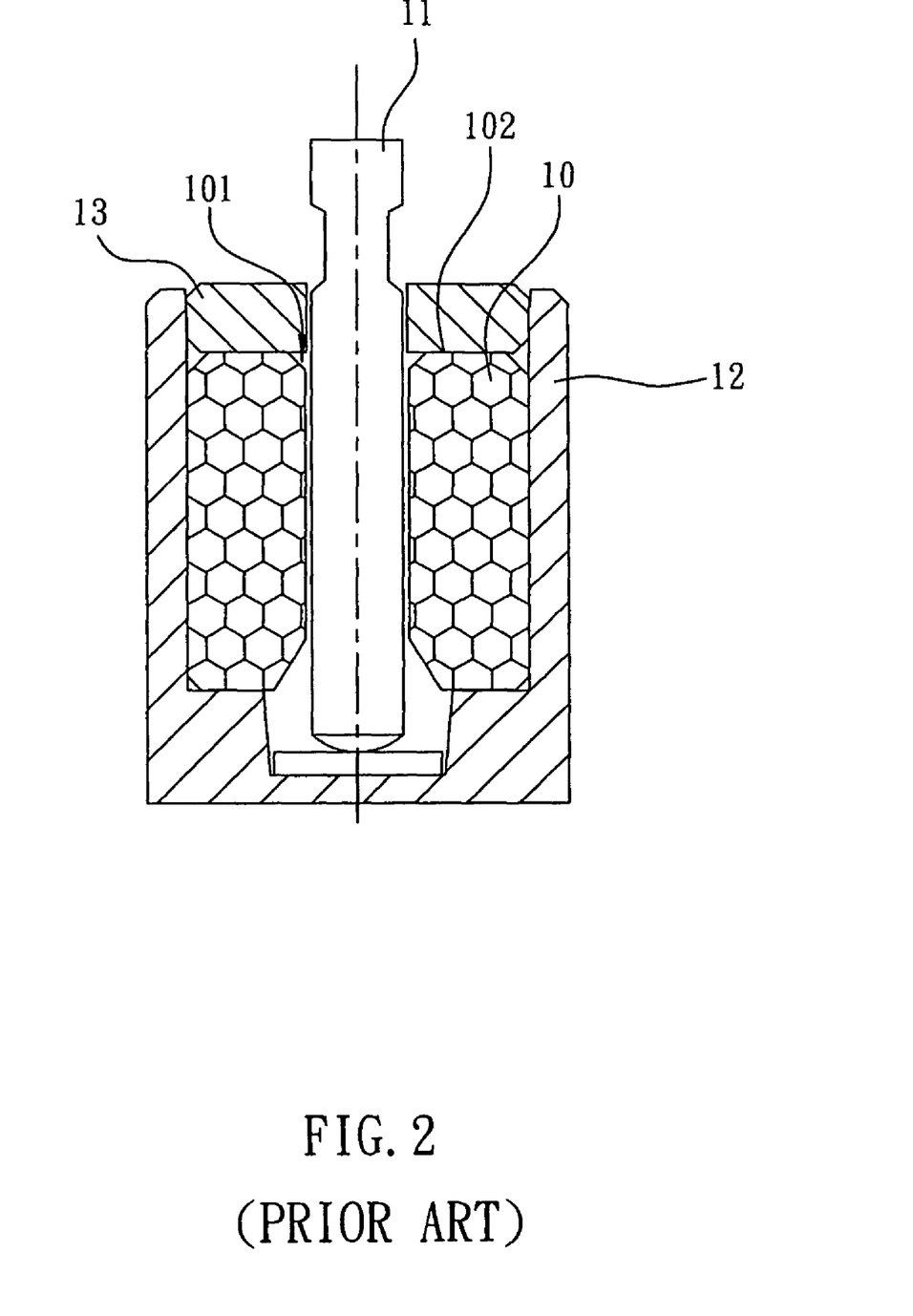
FIG. 2 is a schematic illustration showing the oil bearing of FIG. 1 having a top surface on which a sealing baffle is disposed.

In order to solve this problem, as shown in FIG. 2, an annular flat baffle 13 is disposed on the top surface 102 of the oil bearing 10 in the prior art so as to interrupt the leakage path of the lubrication oil. However, the effect of this method is limited. The lubrication oil still leaks outward from the gap between the oil bearing 10 and the shaft 11, the gap between the baffle 13 and the shaft 11 and the gap between the oil bearing 10 and the bearing tube 12.

Thus, it is desired to provide a fan, a motor and a bearing structure thereof capable of effectively preventing the problem of oil leakage and thus lengthening the lifetime of the fan, motor and oil bearing.

SUMMARY OF THE INVENTION

In view of the foregoing, the invention is to provide a fan, a motor and a bearing structure thereof capable of effectively preventing the problem of oil leakage and thus lengthening the lifetimes of the fan, motor and oil bearing.

To achieve the above, the invention discloses a bearing structure cooperated with a shaft, and the bearing structure is disposed in a bearing tube. The bearing structure comprises an oil bearing and a cylindrical sealing member. The oil bearing has an axial hole. The shaft passes through the axial hole. The cylindrical sealing member covers a top surface of the oil bearing and at least a portion of a sidewall of the oil bearing, and is connected with an inner wall of the bearing tube. The center of the cylindrical sealing member has a hole for the shaft passed therethrough.

To achieve the above, the invention also discloses a bearing structure cooperated with a shaft, and the bearing structure disposed in a bearing tube. The bearing structure comprises an oil bearing and a sealing member. The oil bearing has an axial hole. The shaft passes through the axial hole. The sealing member covers a top surface of the oil bearing. The sealing member has a through hole defined in its center. The shaft passes through the through hole, and an inner wall of the through hole is formed with at least one groove.

To achieve the above, the invention discloses a motor, which comprises a rotor structure, a stator structure, and a bearing structure. The rotor structure has a shaft, and the stator structure has a bearing tube. The bearing structure is disposed in the bearing tube and comprises an oil bearing and a cylindrical sealing member. The oil bearing has an axial hole. The shaft passes through the axial hole. The cylindrical sealing member covers a top surface of the oil bearing and at least a portion of a sidewall of the oil bearing, and is connected with an inner wall of the bearing tube. The cylindrical sealing member has a through hole defined in its center. The shaft passes through the through hole.

To achieve the above, the invention also discloses a motor, which comprises a rotor structure, a stator structure, and a bearing structure. The rotor structure has a shaft, and the stator structure has a bearing tube. The bearing structure is disposed in the bearing tube and comprises an oil bearing and a sealing member. The oil bearing has an axial hole. The shaft passes through the axial hole. The sealing member covers a top surface of the oil bearing. The sealing member has a through hole defined in its center. The shaft passes through the through hole, and an inner wall of the through hole is formed with at least one groove.

To achieve the above, the invention discloses a fan, which comprises an impeller, a rotor structure, a stator structure, and a bearing structure. The impeller has a hub and at least one blade disposed around the hub. The rotor structure has a shaft connected with the hub, and the stator structure has a bearing tube. The bearing structure is disposed in the bearing tube and comprises an oil bearing and a cylindrical sealing member. The oil bearing has an axial hole. The shaft passes through the axial hole. The cylindrical sealing member covers a top surface of the oil bearing and at least one portion of a sidewall of the oil bearing, and is connected with an inner wall of the bearing tube. The cylindrical sealing member has a through hole defined in its center. The shaft passes through the through hole.

To achieve the above, the invention also discloses a fan, which comprises an impeller, a rotor structure, a stator structure, and a bearing structure. The impeller has a hub and at least one blade disposed around the hub. The rotor structure has a shaft connected with the hub, and the stator structure has a bearing tube. The bearing structure is disposed in the bearing tube and comprises an oil bearing and a sealing member. The oil bearing has an axial hole. The shaft passes through the axial hole. The sealing member covers a top surface of the oil bearing. The sealing member has a through hole defined in its center. The shaft passes through the through hole, and an inner wall of the through hole is formed with at least one groove.

As mentioned above, the fan, the motor and the bearing structure thereof according to the invention use the cylindrical sealing member or the sealing member with the groove to cover the oil bearing. Thus, the leakage path of the lubrication oil can be surely interrupted, so that the oil leakage can be avoided, and the lifetime of the oil bearing can be lengthened.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
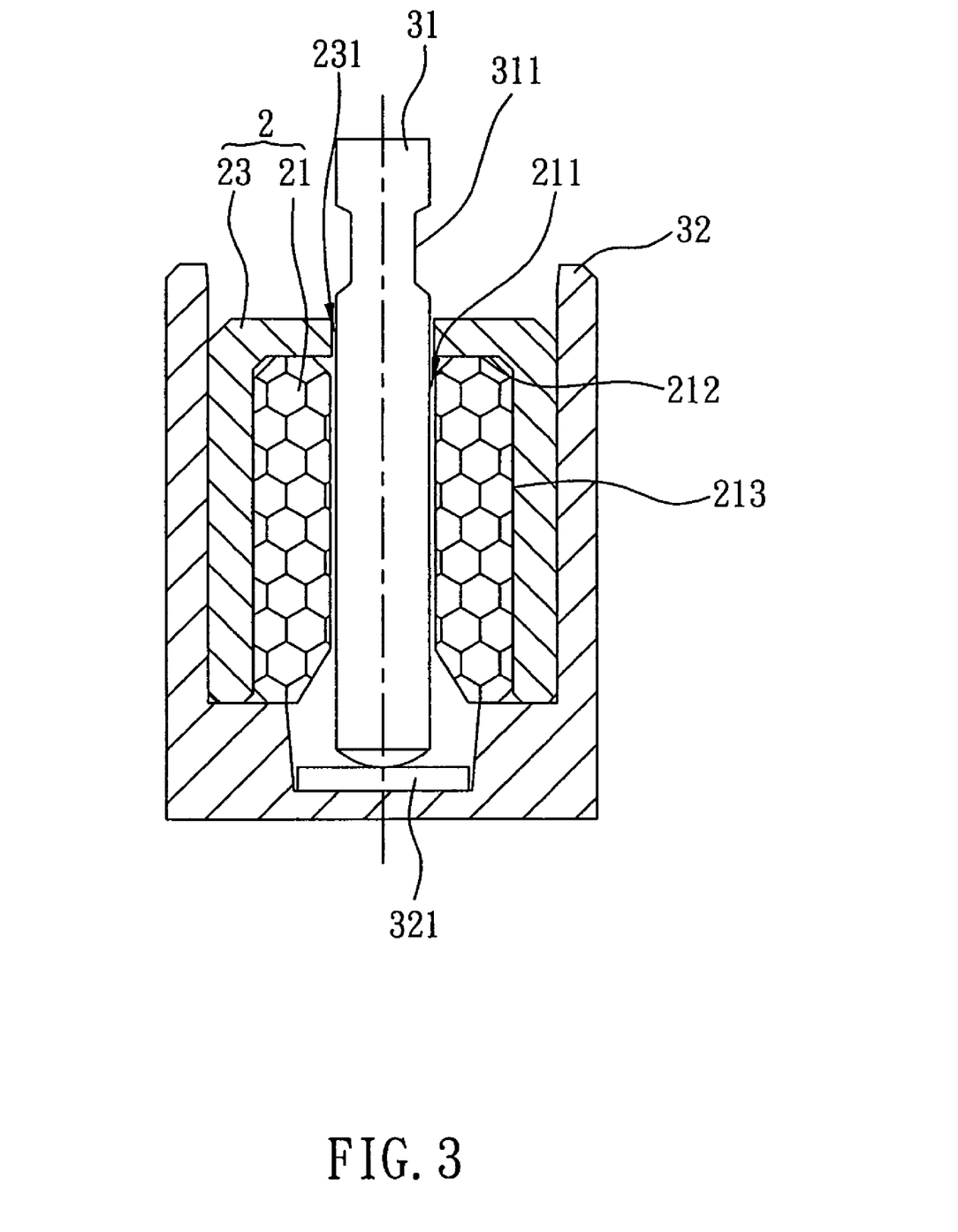
FIG. 3 is a schematic illustration showing a bearing structure cooperated with a shaft and a bearing tube according to a first embodiment of the invention.

As shown in FIG. 3, a bearing structure 2 according to a first embodiment of the invention is cooperated with a shaft 31 and is disposed in a bearing tube 32. When the bearing structure 2 is applied to a motor, the shaft 31 can be a shaft of a rotor structure of the motor, and the bearing tube 32 can be a bearing tube of a stator structure of the motor.

In this embodiment, the bearing tube 32 can be integrally formed. That is, the bearing tube 32 is an integrated member. In addition, a bottom portion of the bearing tube 32 has a wear-resisting structure 321 (e.g., a wear-resisting sheet). Of course, the bearing tube 32 can be composed of a plurality of components in another embodiment. For example, the bottom portion of the bearing tube 32 has an opening, which is sealed by a locking member.

The bearing structure 2 comprises an oil bearing 21 and a cylindrical sealing member 23. The oil bearing 21 has an axial hole 211, and the shaft 31 passes through the axial hole 211. The oil bearing 21 contains the lubrication oil and can release the lubrication oil for lubrication as the shaft 31 rotates.

The cylindrical sealing member 23 covers a top surface 212 and a sidewall 213 of the oil bearing 21. The cylindrical sealing member 23 is disposed in the bearing tube 32 and is connected to an inner wall of the bearing tube 32. In this embodiment, the cylindrical sealing member 23 completely covers, without limitation, the sidewall 213 of the oil bearing 21. However, the cylindrical sealing member 23 can also only cover a portion of the sidewall 213 of the oil bearing 21.

In addition, the cylindrical sealing member 23 has a through hole 231 defined in its center. The diameter of the through hole 231 is substantially equal to or greater than that of the axial hole 211. When the cylindrical sealing member 23 covers the oil bearing 21, the shaft 31 can pass through the through hole 231 and the axial hole 211, and rest against the wear-resisting structure 321.

In this embodiment, the cylindrical sealing member 23 covers the top surface 212 and the sidewall 213 of the oil bearing 21 to form a closed space to prevent the lubrication oil from leaking from the top surface 212 of the oil bearing 21 and the gap between the oil bearing 21 and the bearing tube 32. Because the pressure in the bearing structure 2 is smaller than the atmospheric pressure, it is possible to prevent the lubrication oil from leaking from the gap between the shaft 31 and the oil bearing 21 under the action of the atmospheric pressure, to completely avoid the oil leakage, to effectively hold the lubrication oil within the bearing structure 2 and thus to lengthen the lifetime of the bearing structure 2.

Figure 4A:
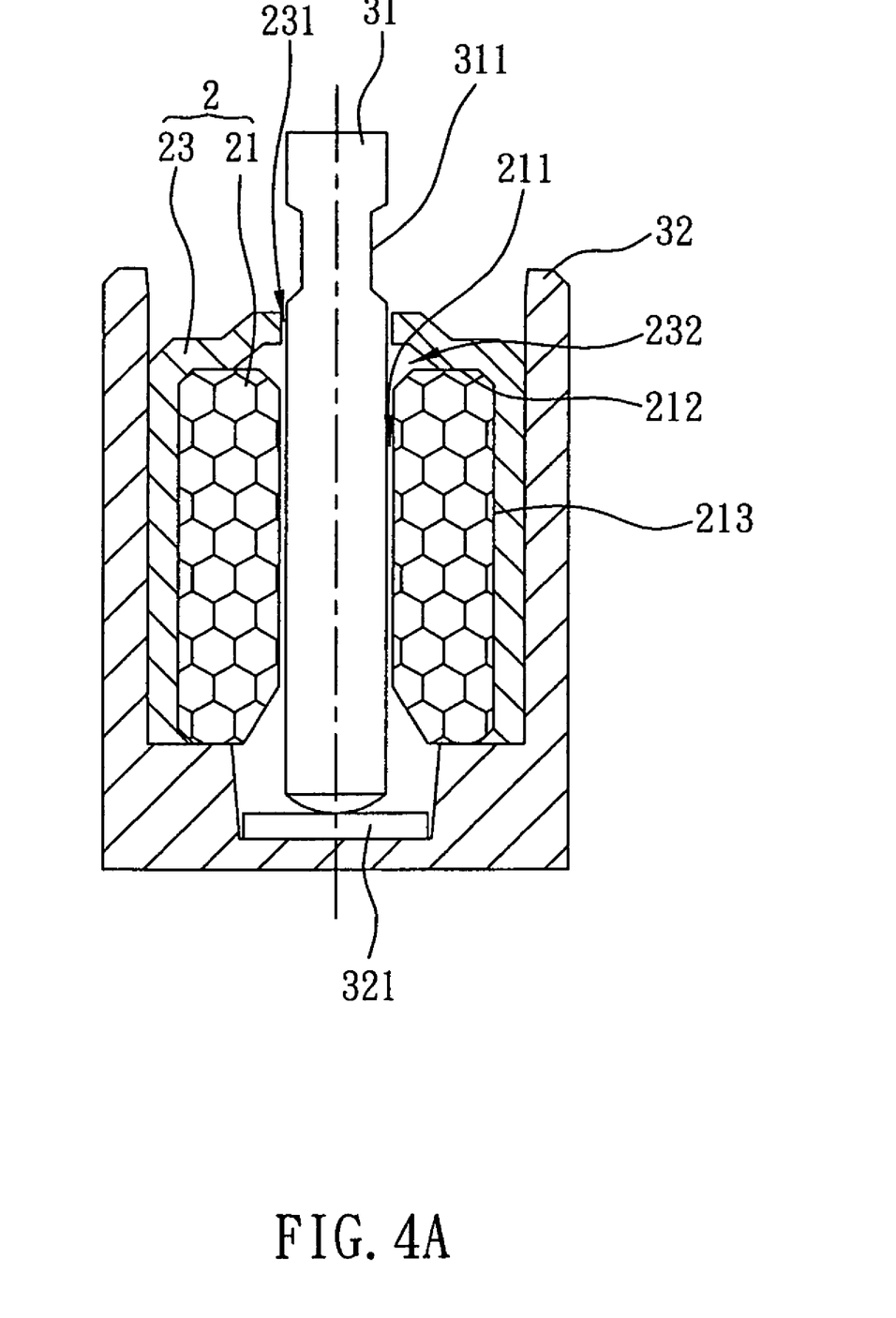
FIGS. 4A and 4B are schematic illustrations showing different aspects of a cylindrical sealing member of the bearing structure of FIG. 3.
Figure 4B:
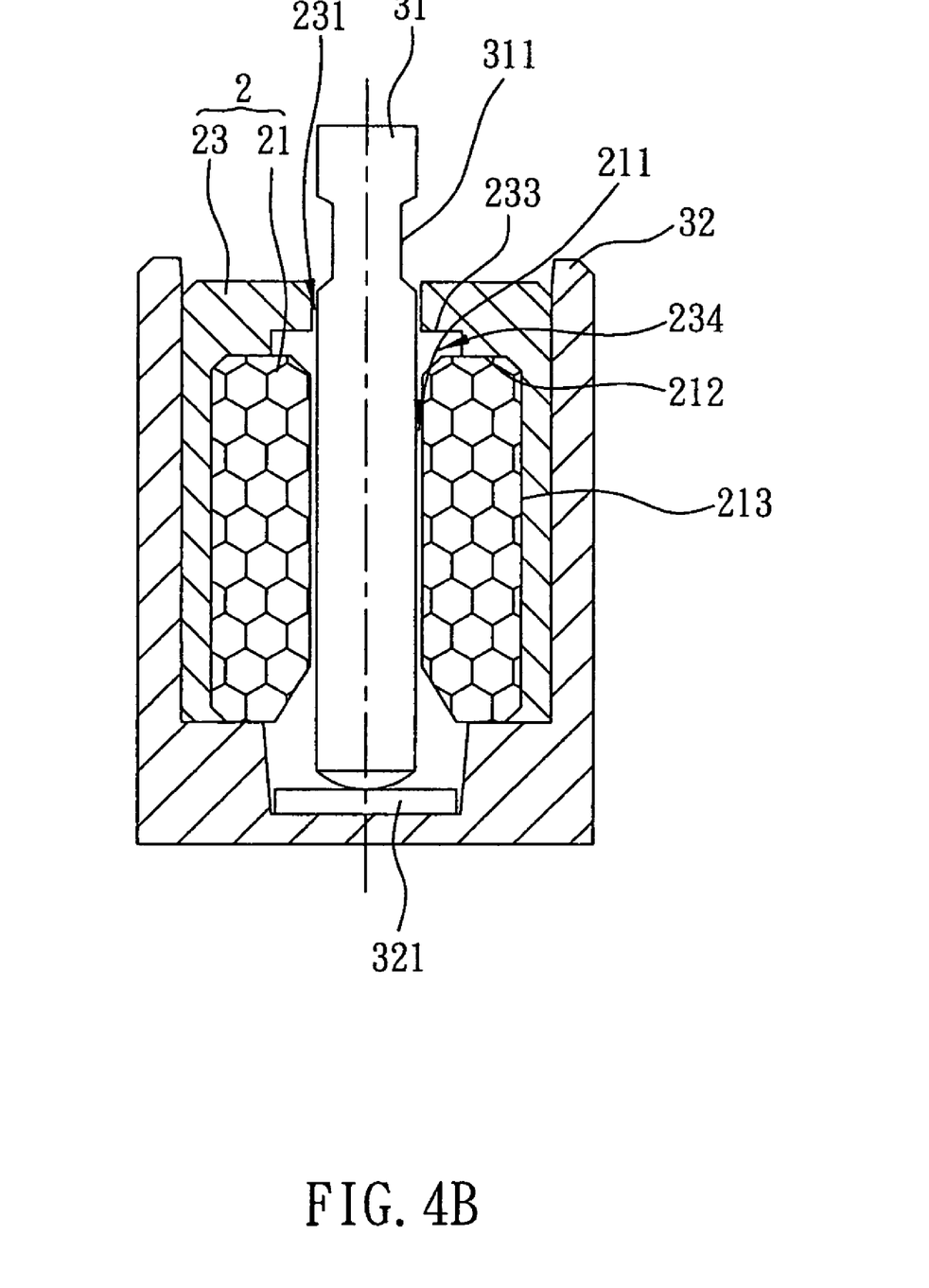

In addition, FIGS. 4A and 4B are schematic illustrations showing different aspects of the cylindrical sealing member of the bearing structure of FIG. 3. The difference between FIG. 4A or 4B and FIG. 3 is that the cylindrical sealing member 23 has a stepped portion such that a space 232 (see FIG. 4A) is formed between the cylindrical sealing member 23 and the top surface 212 of the oil bearing 21. Alternatively, an inner wall 233 of the top surface of the cylindrical sealing member 23 has a concave portion 234 (see FIG. 4B). The space 232 or the concave portion 234 stores the lubrication oil leaked from the oil bearing 21. In addition, the pressure in the space 232 or the concave portion 234 is smaller than the atmospheric pressure so that it is possible to prevent the lubrication oil from leaking from the gap between the shaft 31 and the oil bearing 21 under the action of the atmospheric pressure. In addition, the lubrication oil stored in the space 232 or the concave portion 234 can also flow back to the oil bearing 21 due to gravity so as to maintain the amount of the lubrication oil contained in the oil bearing 21.

Figure 5:
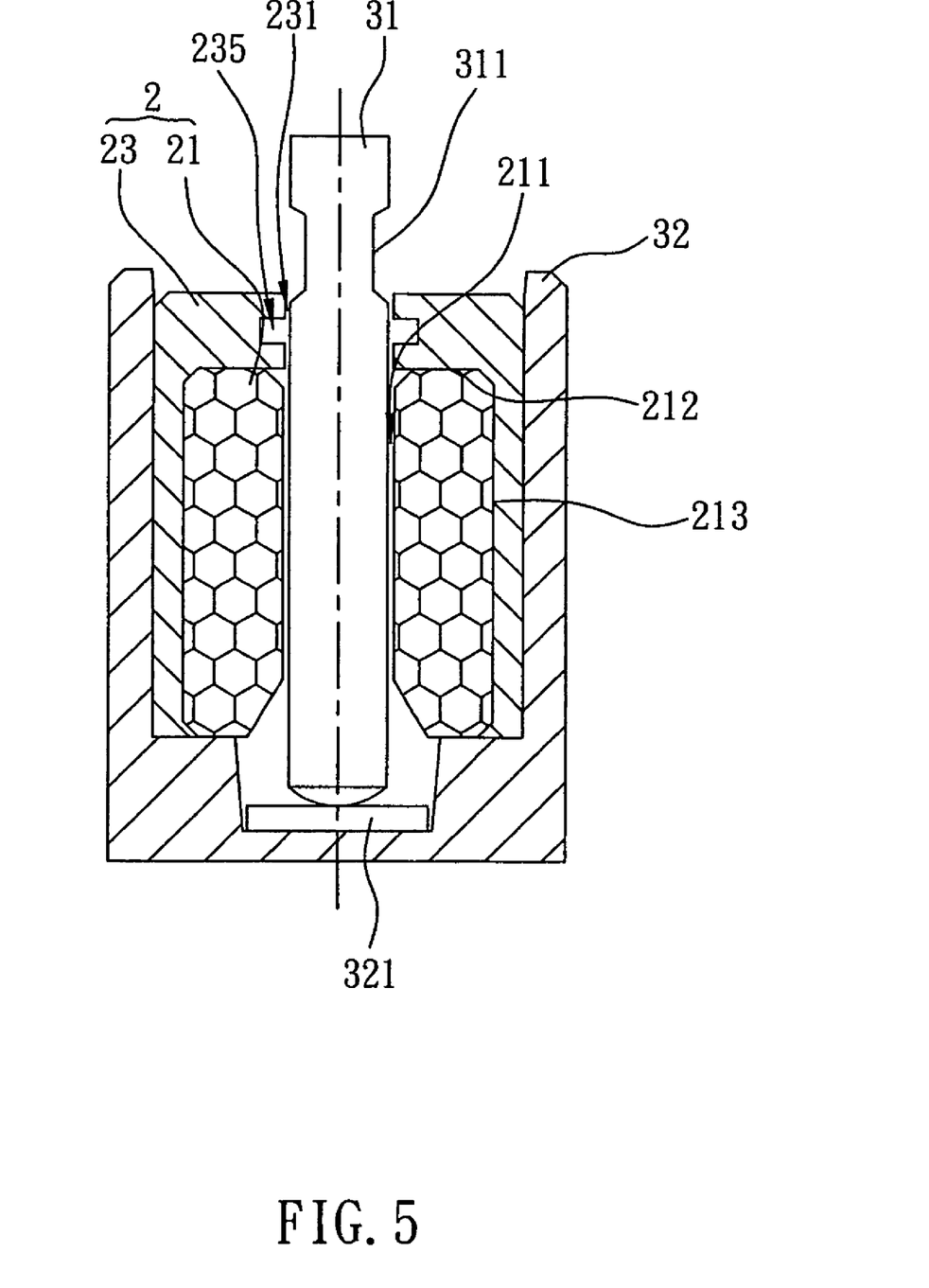
FIG. 5 is another schematic illustration showing the bearing structure of FIG. 3 having a groove formed on an inner wall of a through hole of the cylindrical sealing member.

In addition, FIG. 5 is another schematic illustration showing the bearing structure of FIG. 3. The difference between FIGS. 5 and 3 is that at least one groove 235 such as a ring-shaped groove is formed on the inner wall of the through hole 231 of the cylindrical sealing member 23 in FIG. 5. The groove 235 stores the leaked lubrication oil of the oil bearing 21 and prevents the lubrication oil from leaking from the gap between the shaft 31 and the oil bearing 21 under the action of the atmospheric pressure, because the pressure in the groove 235 is smaller than the atmospheric pressure. In addition, the lubrication oil stored in the groove 235 can flow back to the oil bearing 21 due to gravity so as to maintain the amount of the lubrication oil contained in the oil bearing 21.

Figure 6:
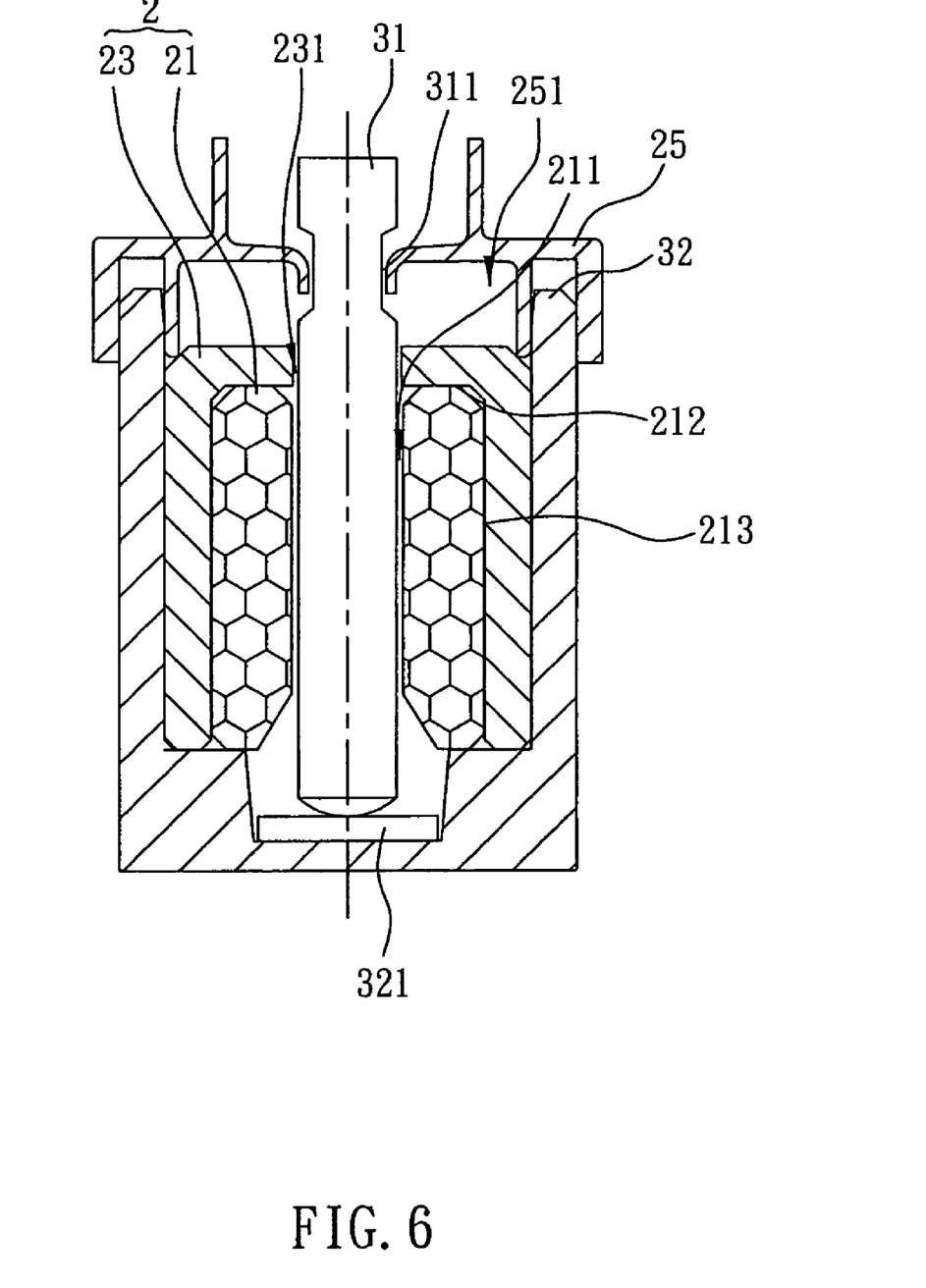
FIG. 6 is a schematic illustration showing a cover disposed on the bearing structure of FIG. 3.

Furthermore, FIG. 6 is a schematic illustration showing a cover disposed on the bearing structure of FIG. 3. The difference between FIGS. 6 and 3 is that the bearing structure 2 can further comprise a cover 25 disposed on the cylindrical sealing member 23, and the bearing structure 2 rests against at least one portion of an outer wall and/or a top surface of the cylindrical sealing member 23. As shown in FIG. 6, the cover 25 is adjacent to a concave portion 311 of the shaft 31 and a space 251 is formed between the cover 25 and the cylindrical sealing member 23. The cover 25 is telescoped onto a side wall of the bearing tube to be fixed therewith. The space 251 can prevent the vapor of the lubrication oil from leaking out so as to enhance the function of avoiding the oil leakage.

Figure 7:
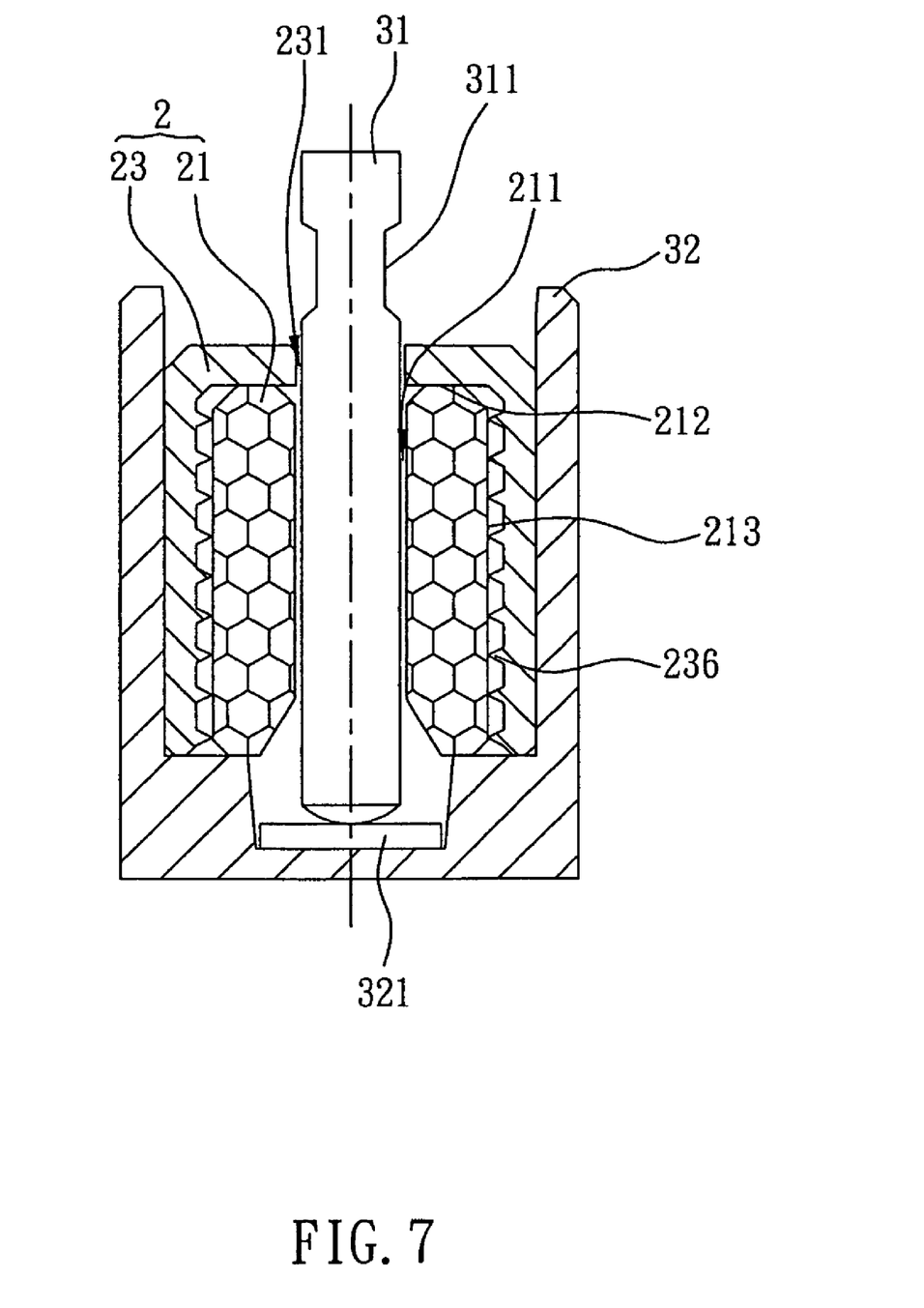
FIG. 7 is a schematic illustration showing at least one protrusion formed on the inner wall of the cylindrical sealing member of the bearing structure of FIG. 3.

FIG. 7 is a schematic illustration showing at least one protrusion formed on the inner wall of the cylindrical sealing member of the bearing structure of FIG. 3. The difference between FIGS. 7 and 3 is that an inner wall of the cylindrical sealing member 23 has at least one protrusion 236. The protrusion 236 rests against the sidewall 213 of the oil bearing 21. The protrusion 236 and the cylindrical sealing member 23 are integrally formed. That is, the protrusion 236 and the cylindrical sealing member 23 form an integrated member. Of course, the protrusion 236 and the cylindrical sealing member 23 can also be individually formed, and then the protrusion 236 is fixed to the inner wall of the cylindrical sealing member 23. As shown in FIG. 7, enabling the protrusion 236 to rest against the oil bearing 21 reduces the precision of manufacturing the cylindrical sealing member 23 and the oil bearing 21 and the tolerances thereof so that the actual manufacturing processes can be easier. Of course, the protrusion 236 can also be disposed on the outer wall of the cylindrical sealing member 23 to rest against the inner wall of the bearing tube 32. Alternatively, the protrusion 236 can be disposed on the sidewall 213 of the oil bearing 21 to rest against the inner wall of the cylindrical sealing member 23, or the protrusion 236 can be disposed on the inner wall of the bearing tube 32 to rest against the outer wall of the cylindrical sealing member 23.

Figure 8:
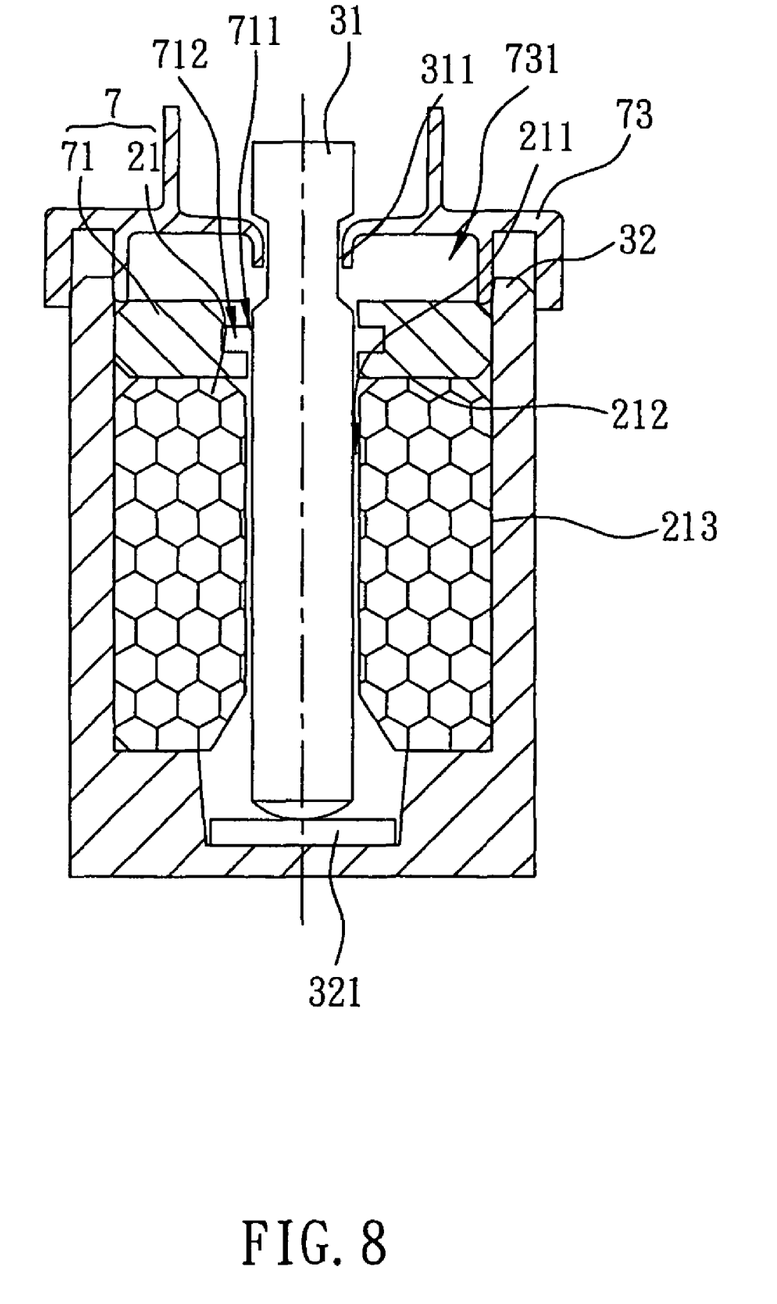
FIG. 8 is a schematic illustration showing a bearing structure cooperated with a shaft and a bearing tube according to a second embodiment of the invention.

FIG. 8 is a schematic illustration showing a bearing structure cooperated with a shaft and a bearing tube according to a second embodiment of the invention. As shown in FIG. 8, a bearing structure 7 according to the second embodiment of the invention is cooperated with a shaft 31 and is disposed in a bearing tube 32. The bearing structure 7 comprises an oil bearing 21 and a sealing member 71. The structures and functions of the shaft 31, the bearing tube 32 and the oil bearing 21 are the same as those mentioned herein above, and detailed descriptions thereof will be omitted.

The sealing member 71 covers a top surface 212 of the oil bearing 21 and is connected to the inner wall of the bearing tube 32. The sealing member 71 has a through hole 711 defined in its center. The diameter of the through hole 711 is substantially equal to or greater than that of the axial hole 211.

When the sealing member 71 covers the top surface 212 of the oil bearing 21, the shaft 31 can pass through the through hole 711 and the axial hole 211, and the shaft 31 rests against the wear-resisting structure 321. In addition, the inner wall of the through hole 711 is formed with at least one groove 712. The groove 712 can be a ring-shaped groove which stores the lubrication oil leaked from the oil bearing 21.

The bearing structure 7 of this embodiment has the sealing member 71 covering the top surface 212 of the oil bearing 21 to form a closed space. Therefore, it is possible to prevent the lubrication oil from leaking from the top surface 212 of the oil bearing 21 and the gap between the oil bearing 21 and the bearing tube 32. Under the action of the atmospheric pressure, it is possible to prevent the lubrication oil from leaking from the gap between the shaft 31 and the oil bearing 21, and the lubrication oil stored in the groove 712 can properly flow back to the oil bearing 21 due to the gravity. Thus, the oil leakage can be avoided to effectively hold the lubrication oil in the oil bearing 21 and thus lengthen the lifetime of the oil bearing 21. In addition, the bearing structure 7 of this embodiment can further comprise a cover 73, which rests against a top surface of the sealing member 71 and is adjacent to the concave portion 311 of the shaft 31 to form a space 731 with the sealing member 71. The cover 73 is telescoped onto a side wall of the bearing tube to be fixed therewith. The space 731 can prevent the oil gas of the lubrication oil from leaking out so as to enhance the effect of avoiding the oil leakage.

Figure 9:
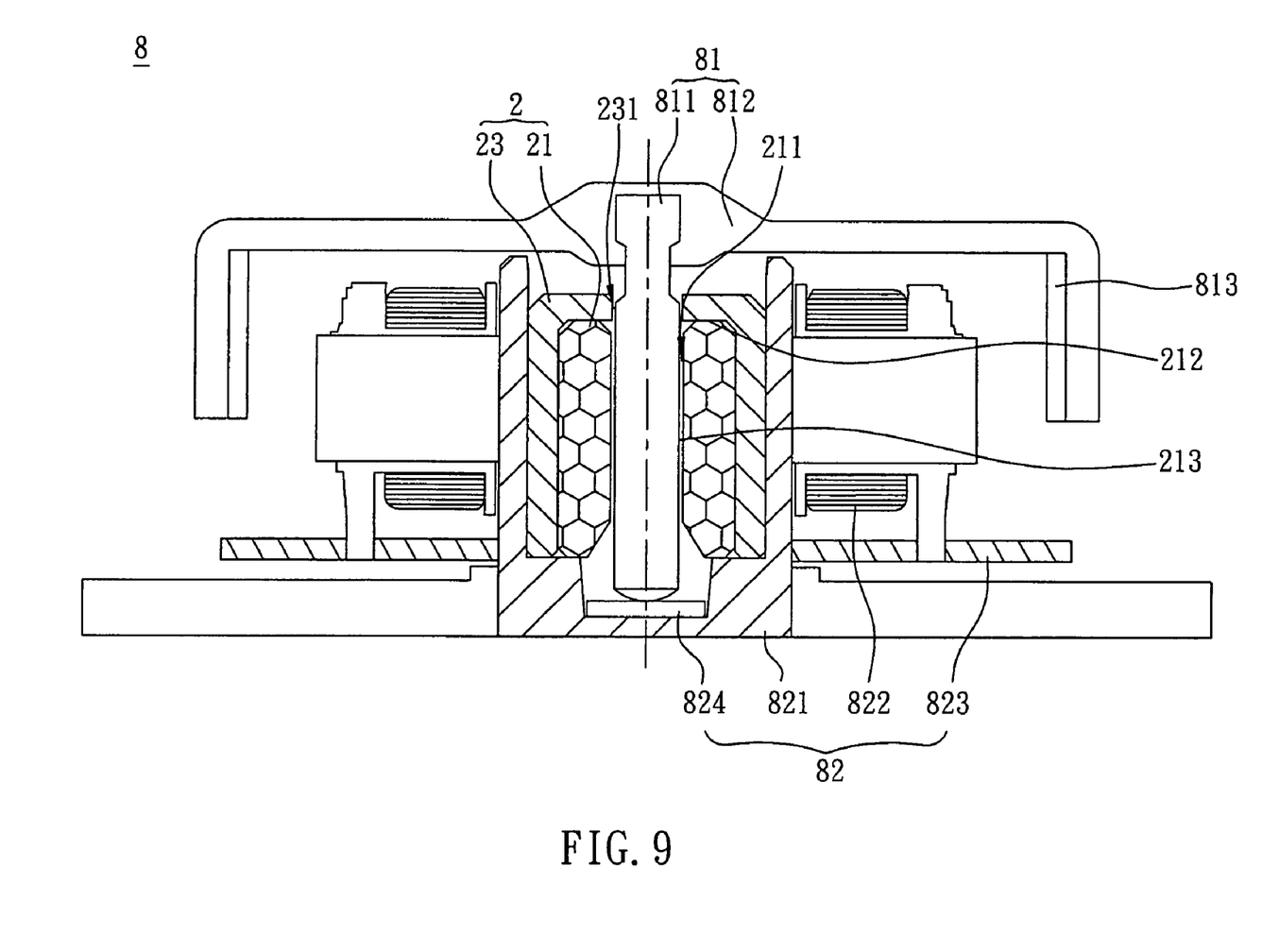
FIG. 9 is a schematic illustration showing a motor according to the preferred embodiment of the invention.

FIG. 9 is a schematic illustration showing a motor 8 according to the preferred embodiment of the invention. In practice, the bearing structure 2 or 7 can be applied to the motor 8. As shown in FIG. 9, the bearing structure 2 of FIG. 3 will be illustrated. The motor 8 comprises a rotor structure 81, a stator structure 82 and a bearing structure 2.

The rotor structure 81 comprises a shaft 811 and a cover 812 as shown in FIG. 9. The shaft 811 is embedded into the cover 812. In addition, the shaft 811 and the cover 812 can also be integrally formed. That is, the shaft 811 and the cover 812 can form a single body. A magnet 813, which can be a permanent magnet, can be is attached to the inner surface of the cover 812. In this embodiment, the magnet 813 has a ring-shaped structure and is disposed on the inner side of the cover 812.

The stator structure 82 has a bearing tube 821, a stator magnetic pole 822 and a circuit board 823. The stator magnetic pole 822 is formed by winding a coil or coils and is opposite to the magnet 813. The alternating action of the magnetic field enables the rotor structure 81 to move relative to the stator structure 82. The bearing tube 821 is inserted into a hole of the circuit board 823. A sensor is disposed on the circuit board 823 to sense and control the magnetic field of the stator structure 82. In addition, the bearing tube 821 further has a wear-resisting structure 824 such as a wear-resisting sheet. When the shaft 811 is axially mounted into the bearing tube 821, the shaft 811 rests against the wear-resisting structure 824.

The bearing structure 2 is cooperated with the shaft 811 and disposed in the bearing tube 821. The bearing structure 2 has an oil bearing 21 and a cylindrical sealing member 23. The oil bearing 21 has an axial hole 211, and the shaft 811 passes through the axial hole 211.

The cylindrical sealing member 23 covers the top surface 212 and the sidewall 213 of the oil bearing 21, and is connected with the inner wall of the bearing tube 32. In addition, the cylindrical sealing member 23 has a through hole 231 defined in its center. The diameter of the through hole 231 is substantially equal to or greater than that of the axial hole 211. When the cylindrical sealing member 23 covers the oil bearing 21, the shaft 811 can pass through the through hole 231 and the axial hole 211 and rest against the wear-resisting structure 824.

In this embodiment, the cylindrical sealing member 23 covers the top surface 212 and the sidewall 213 of the oil bearing 21 to form a closed space. Thus, it is possible to prevent the lubrication oil from leaking from the top surface 212 of the oil bearing 21 and the gap between the oil bearing 21 and the bearing tube 821. Under the action of the atmospheric pressure, it is possible to prevent the lubrication oil from leaking from the gap between the shaft 811 and the oil bearing 21 so that the oil leakage can be avoided, the lubrication oil can be effectively held in the bearing structure 2, and the lifetime of the motor 8 can be lengthened.

Figure 10:
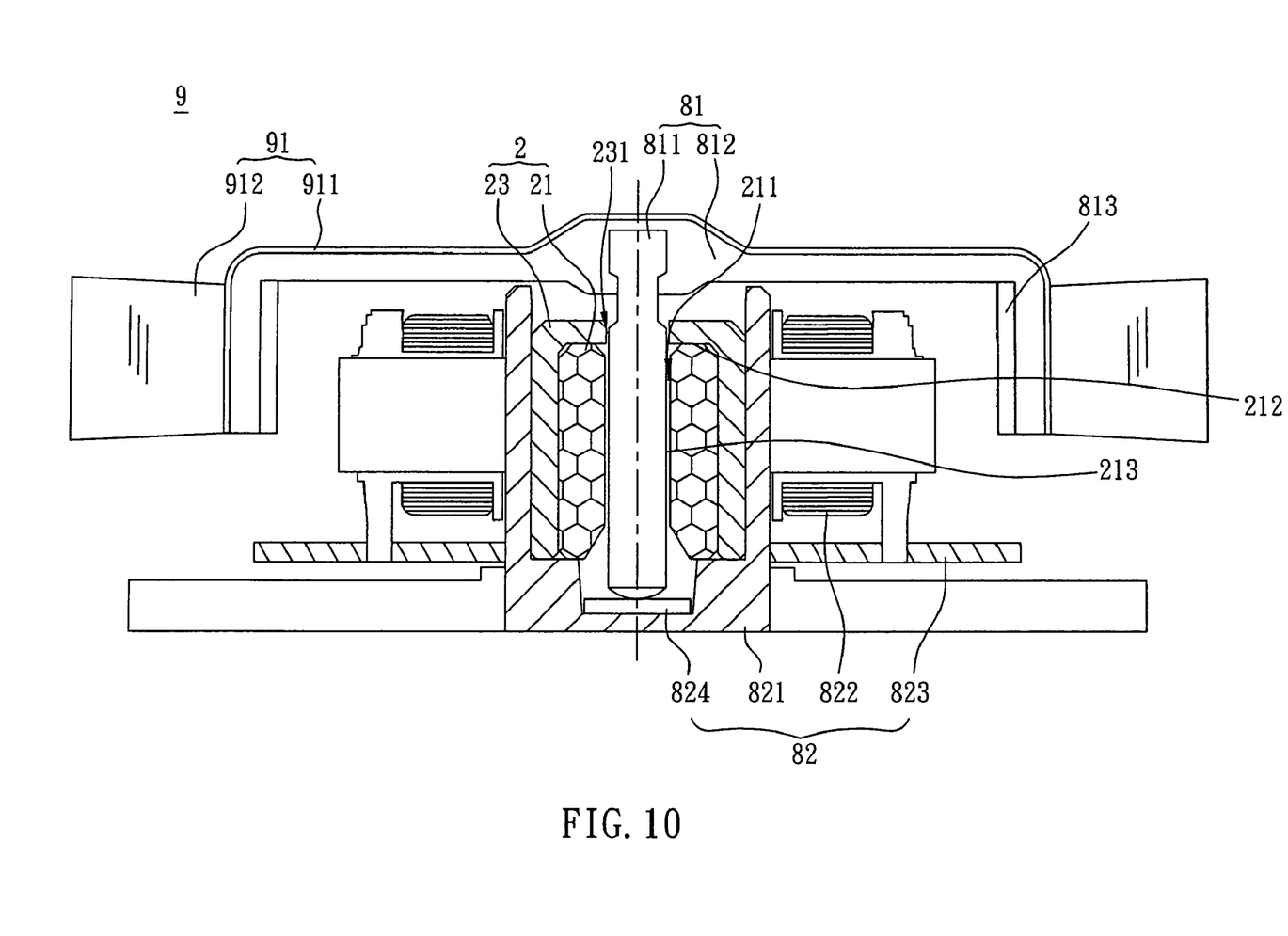
FIG. 10 is a schematic illustration showing a fan according to the preferred embodiment of the invention.

FIG. 10 is a schematic illustration showing a fan 9 according to the preferred embodiment of the invention. As shown in FIG. 10, the motor 8 can be applied to the fan 9. The fan 9 comprises an impeller 91, a rotor structure 81, a stator structure 82 and a bearing structure 2. The rotor structure 81, the stator structure 82 and the bearing structure 2 have the same structures and functions as those described hereinabove, so detailed descriptions thereof will be omitted.

The impeller 91 is connected with the rotor structure 81 in this embodiment. The impeller 91 comprises a hub 911 and at least one blade 912, which is disposed on and connected with a circumference of the hub 911. The fan 9 of this embodiment rotates the impeller 91 by the rotor structure 81.

In summary, the fan, the motor and the bearing structure thereof according to the invention use the cylindrical sealing member or the sealing member with the groove to cover the oil bearing. Thus, the leakage path of the lubrication oil can be surely interrupted, so that the oil leakage can be avoided, and the lifetime of the oil bearing can be lengthened.

Although the invention has been described with reference to specific embodiments; this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A bearing structure disposed in a bearing tube, comprising:
   an oil bearing having an axial hole for being passed through by a shaft; and
   a sealing member covering a top surface of the oil bearing and a sidewall of the oil bearing, wherein the sealing member has a through hole for being passed through by the shaft, and the sidewall of the oil bearing does not contact with the bearing tube.

2. The bearing structure according to claim 1, further comprising a cover disposed on the sealing member.

3. The bearing structure according to claim 2, wherein an inner wall of the through hole is formed with at least one groove.

4. The bearing structure according to claim 2, wherein the cover rests against the sealing member to form a space between the cover and the sealing member.

5. The bearing structure according to claim 2, wherein the cover is telescoped onto a sidewall of the bearing tube.

6. The bearing structure according to claim 5, wherein the cover contacts at least one portion of an outer wall of the sealing member and/or at least one portion of a top surface of the sealing member.

7. The bearing structure according to claim 5, wherein the cover is disposed adjacent to a concave portion of the shaft.

8. The bearing structure according to claim 1, wherein the sealing member comprises a stepped portion to define a space between the sealing member and the top surface of the oil bearing.

9. The bearing structure according to claim 1, wherein an inner wall of the sealing structure has at least one protrusion resting against the sidewall of the oil bearing.

10. The bearing structure according to claim 1, wherein the sidewall of the sealing member has at least one protrusion resting against the sidewall of the oil bearing.

11. The bearing structure according to claim 1, wherein the bearing structure is applied in a fan or motor.

12. A bearing structure disposed in a bearing tube, comprising:
    an oil bearing having an axial hole for being passed through by a shaft; and
    a sealing member covering a top surface of the oil bearing, wherein the sealing member has a through hole for being passed through by the shaft, and a sidewall of the oil bearing does not contact with the bearing tube.

13. The bearing structure according to claim 12, further comprising a cover disposed on the sealing member.

14. The bearing structure according to claim 13, wherein an inner wall of the through hole is formed with at least one groove.

15. The bearing structure according to claim 13, wherein the cover rests against the sealing member to form a space between the cover and the sealing member.

16. The bearing structure according to claim 13, wherein the cover is telescoped onto a sidewall of the bearing tube.

17. The bearing structure according to claim 16, wherein the cover contacts at least one portion of an outer wall of the sealing member and/or at least one portion of a top surface of the sealing member.

18. The bearing structure according to claim 16, wherein the cover is disposed adjacent to a concave portion of the shaft.

19. The bearing structure according to claim 12, wherein a bottom portion of the bearing tube has a wear-resisting structure resting against the shaft.

20. The bearing structure according to claim 12, wherein the bearing structure is applied in a fan or motor.

* * * * *